United States Patent [19]

Mezzanotte

[11] 4,231,409
[45] Nov. 4, 1980

[54] RADIAL VEHICLE TIRE

[75] Inventor: Mario Mezzanotte, Milan, Italy

[73] Assignee: Societa Pneumatici Pirelli S.p.A., Milan, Italy

[21] Appl. No.: 888,999

[22] Filed: Mar. 22, 1978

[30] Foreign Application Priority Data

Apr. 7, 1977 [IT] Italy ............................... 22150 A/77

[51] Int. Cl.³ .................. B60C 15/04; B60C 15/06; B60C 9/02
[52] U.S. Cl. ................................ 152/354 R; 152/355
[58] Field of Search ............ 152/354 R, 354 RB, 355, 152/357, 362 R, 362 CS, 374

[56] References Cited

U.S. PATENT DOCUMENTS

| | | | |
|---|---|---|---|
| 3,480,065 | 11/1969 | Verjier | 152/354 |
| 3,500,890 | 3/1970 | Boileau | 152/354 |
| 3,853,163 | 12/1974 | Mezzanotte | 152/355 |
| 4,029,137 | 6/1977 | Suyjam | 152/354 R |
| 4,047,551 | 9/1977 | Mezzanotte | 152/355 |

*Primary Examiner*—Richard A. Bertsch
*Attorney, Agent, or Firm*—Stevens, Davis, Miller & Mosher

[57] ABSTRACT

This invention provides a pneumatic tire for vehicle wheels having a carcass, a tread and a breaker structure. The breaker structure has at least two layers of parallel cords at an angle of 10°–35° and made of a material having a tensile strength of at least 260 kg/mm². The cords of one layer are crossed with respect to those of the adjacent layer. The breaker structure also has at least one strip of textile cords made of a material which shrinks in length when heated. The tire also has in each sidewall, a reinforcing element of at least one layer of textile or metal cords inclined with respect to the circumferential lines of the tire and at least two layers of cords parallel to each other in each layer and crossed with respect to those of the adjacent layer.

10 Claims, 3 Drawing Figures

RADIAL VEHICLE TIRE

This invention relates to radial tires for motor vehicles having a carcass whose textile or metal cords lie in radial planes or form small angles with the radial planes, and, more particularly, to an improved method of stiffening the sidewalls of radial tires to adapt them for running at high speed.

Radial tires comprising in their sidewalls reinforcing elements, generally arranged in an axially outer position with respect to the carcass and to its turn-ups, are already known. The reinforcing elements are inserted in the tire carcass to stiffen the sidewalls, which otherwise would be too deformable, especially in the transversal direction, and also to reduce the difference in stiffness between the breaker, sidewalls and beads of the tire.

These reinforcements may be strips of cords arranged in the lower zone of the sidewall, i.e. extending from the bead core zone as far as about one half of the height of the tire section. The reinforcing elements are much more or less inclined with respect to the circumferential lines of the tire itself.

Examples of tires having reinforcements of this kind are described in Italian Pat. No. 956,061 and the corresponding U.S. Pat. No. 3,853,163 granted on Dec. 10, 1974, and in U.S. Patent Application Ser. No. 476,865 filed on June 6, 1974, now abandoned, assigned to same Assignee as the assignee of this application.

Radial tires whose sidewalls are reinforced across their whole width by one of more strips which extend from the bead zone as far as the shoulder and having their ends not connected to any structural element of the tire, are also known.

It has been ascertained that radial tires having these prior art reinforcing elements in their sidewalls are not entirely satisfactory for running at high speeds. Certain disadvantages arise both from the high rotation speed and from the fact that the tires may be subjected to forces acting perpendicularly to the equatorial plane, for instance when the tire is cornering or when it is struck transversally by wind.

Some of these disadvantages are those which will be called, for sake of convenience, the "dynamic wave" by which the sidewall is concerned, the "plate effect" of the breaker and the "out limit".

The dynamic wave is due to the difference in stiffness existing between the breaker, sidewalls and beads, which persists even when the sidewalls are reinforced along their whole width, as described above.

When the sidewalls are subjected to a large number of deformations in a short period of time (which happens when the tire rotates at high speeds), the sidewalls become stressed and heated excessively.

The effect of these stresses and heating is the sudden separation of the layers of the tire breaker at its lateral ends with serious consequences which can be easily imagined, considering the speed at which they take place.

The disadvantages defined as "out limit" and "plate effect" are instead related, in addition to the high rotation speed, to the action of forces perpendicular to the equatorial plane of the tire.

In fact, in the event of very high transversal forces, the tire can be subjected to a stress which is greater than that it can bear, since the stresses generated in the contact area are not sufficiently spread over the whole tire, owing to the difference of stiffness existing between the reinforcing elements present in the sidewall and the breaker and the reinforcing elements of the beads.

Consequently, instead of the whole tire reacting by displacing axially with respect to the rim, the tire contact area is reduced, with the risk of reaching the traction limit. This phenomenon is defined as "out limit", and it can be enhanced by the so-called "plate effect" of the breaker. In fact, in consequence of the insufficient contribution of the sidewall reinforcing structure to a correct distribution of the considerable stresses due to the transversal forces and, at the same time, to the high rotation speed, these stresses concentrate at the breaker. This, because of its rigid structure, can be compared to a plate, which rotates on its outer side, namely the side facing that to which the transversal force is applied, and rises, so as to reduce the tire contact area. Therefore, the ability of the tire to transmit driving or braking forces to the ground decreases.

An object of this invention is to provide a radial tire having sidewalls which are stiffened in such a way that the above disadvantages could by insufficient transverse rigidity and to the difference in stiffness existing between the breaker, sidewalls and beads are eliminated.

The present invention will be better understood with reference to the following description together with the attached drawing sheets wherein.

Figure 1:
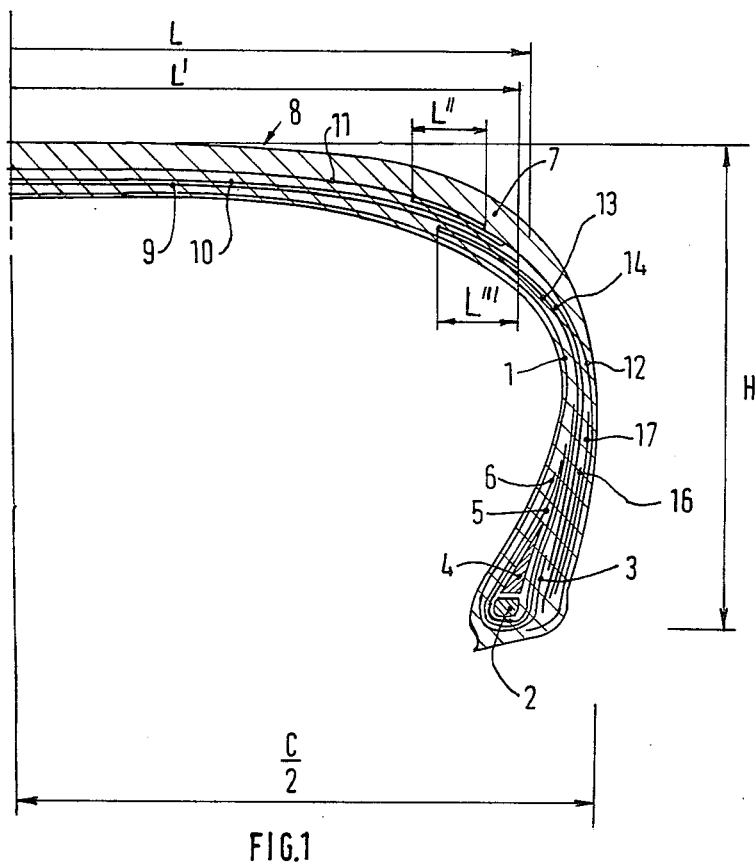
FIG. 1 illustrates a half section taken along a radial plane of an embodiment of a tire provided by the invention.

The objects of the invention are accomplished in accordance with this invention, generally speaking by providing a pneumatic tire for vehicle wheels which comprises a carcass having at least one layer of cords lying in substantially radial planes, a tread and a breaker structure arranged between the carcass and the tread which has at least two layers of cords made of a material having a tensile strength of at least 260 kg/mm$^2$, the cords being parallel to one another in each layer and crossed with respect to those of the adjacent layer and forming an angle ranging between 10° and 35° with respect to the equatorial plane and by at least one strip of textile cords made of a material decreasing in length in consequence of a heat treatment, said textile cords being parallel to the equatorial plane and being arranged in a radially outermost position with respect to said layers, said tire comprising, in each sidewall, a reinforcing element consisting of at least one layer of textile or metal cords inclined with respect to the circumferential lines of the tire, said reinforcing element extending radially at least from the equatorial zone axially adjacent the bead core as far as to penetrate, with its radially outer portion, between said layers and said breaker strip, the penetration portion of said reinforcing element between said layers and said strip ranging from 5% to 30% of the breaker width, said reinforcing element being arranged in an axially outermost position with respect to the carcass, said tire being characterized in that it further comprises—in each sidewall—at least two layers of cords in each layer which are parallel to each other and are crossed with respect to the cords of the adjacent layer, said cords forming an angle ranging from 30° to 65° with respect to the circumferential lines, said two layers being arranged between the carcass and the reinforcing element and extending radially, from the zone axially adjacent the bead core as far as to penetrate, with their radially outer portion, between the carcass and the breaker layers, and in that said reinforcing element has its cords inclined at an angle ranging from 25° to 90°.

It is to be borne in mind that the cords both of the reinforcing element and of the two layers present in each sidewall are subjected during the shaping of the tire carcass to a variation of inclination along the sidewall itself so that they, in the finished tire, will have an angle of inclination, variable along their own path, which decreases by 5° to 15° (still with respect to the circumferential lines) as said cords gradually leave the bead to move towards the breaker. Therefore, the above indicated range of angle values is to be considered as corresponding to the actual inclination values of the cords in the finished tire.

A further object of the present invention is to provide a tire of the type described above, characterized in that it has in each sidewall at least one strip of textile cords parallel to the circumferential lines and arranged in an axially outermost position with respect to the reinforcing element, the strip extending from the shoulder zone as far as at least one half of the height of the tire section.

Referring now to FIG. 1 which represents a half section of a radial tire, 385/30 VR 15 in size, and having a H/C ratio equal to 0.3, in which the cords of the carcass ply (or plies) 1, at the time of its application on the building drum, lie substantially in radial planes; the cords, however, because of the pantograph-type action exerted on them during the shaping step by the various reinforcing elements arranged in the sidewalls according to the present invention, being able to form in the finished tire angles reaching a value of 75°–80° with respect to the circumferential lines.

These cords are preferably made of textile material, such as an aliphatic polyamide such as nylon. The end of the carcass ply is wound up from the inside to the outside about the metal core 2 so that its turn-up 3 extends radially into the bead zone as far as to reach 15% of the tire section height H (which hereinafter will be simply indicated with H). In a radially outer position with respect to the metal core 2, provision is made of a filling of elastomeric material 4, having a hardness of at least 90° Shore, which extends sufficiently far to reach 18% of H. Two flippers 5 and 6 are arranged about the bead and the filler 4 with their ends staggered with respect to each other as is usually done and to extend as far as to reach about 45% of H.

The two flippers are made of cords of textile material, parallel to one another in each flipper and inclined by about 35° with respect to the circumferential lines of the tire. The flippers are so positioned that the cords of the one cross those of the other.

Figure 2:
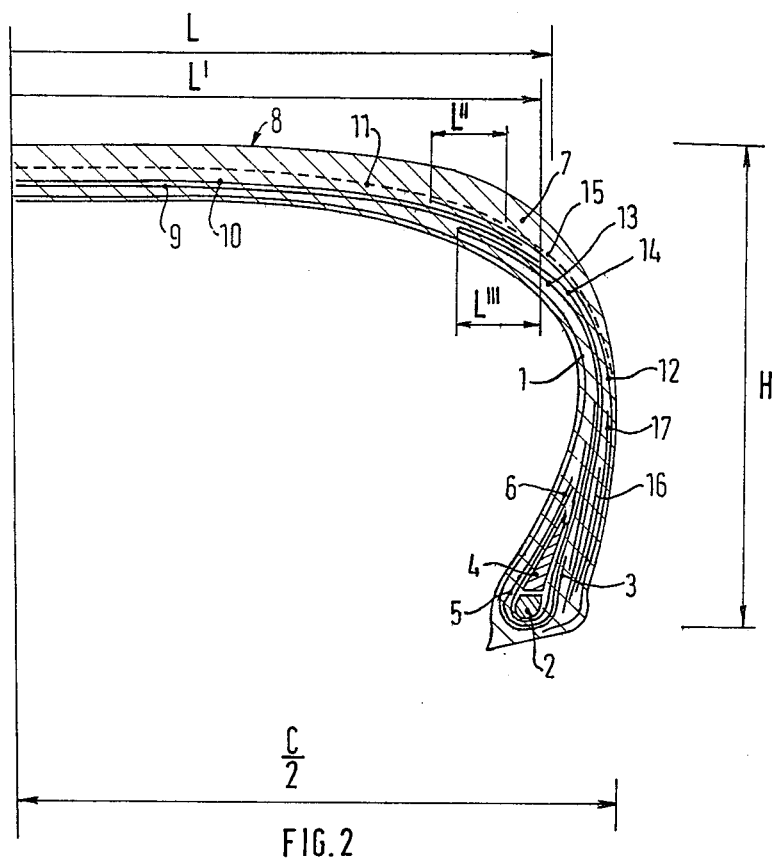
FIG. 2 illustrates a half section taken along a radial plane of a second embodiment of the tire provided by the invention.
Figure 3:
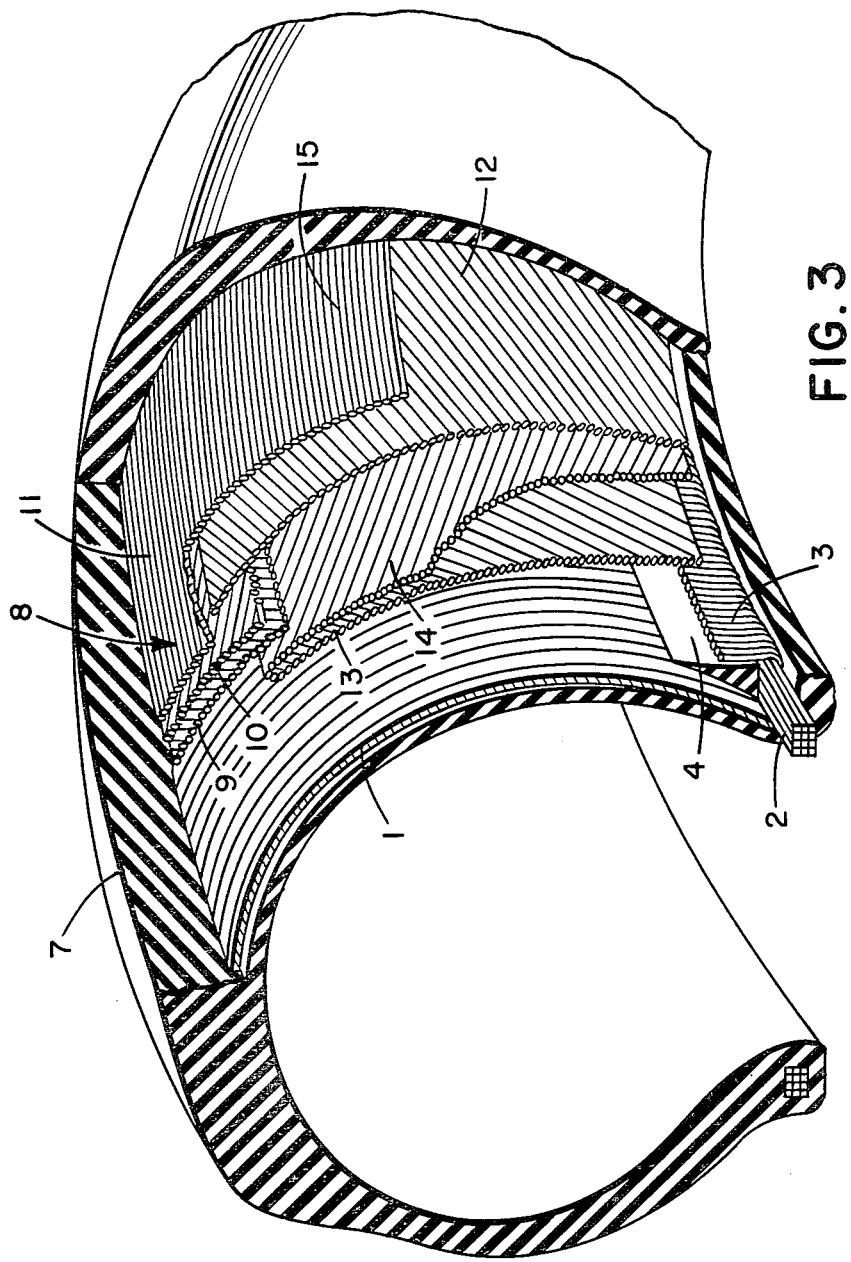
FIG. 3 illustrates a perspective view of an embodiment according to FIG. 2.

The tire shown in FIGS. 1, 2 and 3 comprise a tread 7 having a width L equal to 380 mm. Between the tread and the carcass, there is a breaker 8 which has two layers of steel cords 9 and 10, inclined at 20° with respect to the equatorial plane. These cords may be made of a non-metallic material, which, however, must have a tensile strength at least equal to the tensile strength of steel, such as for instance an aromatic polyamide or "aramide". The two layers are arranged in a radially outer position with respect to the carcass ply and are staggered from each other as is usually done. The breaker 8 further comprises, in a radially outer position with respect to said layers, a strip 11 made of cords arranged parallel to the equatorial plane. These cords are made of a textile material which reduces in length when it is subjected to a heat treatment, as for instance an aliphatic polyamide, nylon. Along the whole tire sidewall, provision is made of a reinforcing element 12, starting from the zone which is radially inner with respect to the core 2, which penetrates, at the radially outer portion, between the strip 11 of aliphatic nylon cords and the two layers 9 and 10 of metal cords of the breaker; the reinforcing element consists of cords inclined, with respect to the circumferential lines, at an angle which varies along their path, from 32° at the bead to about 25° at the radially outer portion of the reinforcing element. Preferably, the cords of the reinforcing element are made of textile material, such as aliphatic nylon; however, they might be metal cords of the high elongation type.

The width L" of the radially outer portion of the reinforcing element inserted between the elements of the breaker corresponds to about 16% of the width L' of the breaker (in the practice, L' is equal to 370 mm and L" to 60 mm).

The inclination of the cords of the reinforcing element with respect to the circumferential lines is selected as a function of ratio H/C; for a ratio H/C=1, the inclination of the cords will correspond to an angle ranging between 55° and 90° with the circumferential lines; for H/C ratios intermediate between 1 and 0.3, the selected angle will have a value ranging between 55° and 25°.

According to the present invention, the tire sidewall comprises two layers (13, 14) of textile cords (or high elongation metal cords) which are parallel to one another in each layer and are crossed with respect to those of the adjacent layers. These cords form an angle of about 50° with respect to the circumferential lines.

The two layers are positioned between the carcass ply 1 and the reinforcing element 12 and extend radially from the zone near the core 2 as far as to penetrate, with their radially outer portion, between carcass ply 1 and the two layers 9 and 10 of the breaker.

In the embodiment shown in FIG. 1, the two layers with a single ply, preferably made of aliphatic nylon cords, which is then folded upon itself in such a way that the folding edge is preferably inserted between the metal layers 9 and 10 of the breaker and the carcass ply 1. As can be seen from FIG. 1 the skirting member 13 of the ply extends radially, from the bead zone along the sidewalls, adjacent to the carcass, as far as to penetrate between the carcass ply 1 and the metal layers 9 and 10, where the ply is folded, so as to originate a skirting 14 extending on its turn along the sidewall as far as to reach the bead zone.

Preferably, the free end of the axially innermost skirting 13 is contiguous to the edge of the carcass turn-up 3 in such a way as to constitute practically a prolongation of the turn-up portion.

Instead, the free end of the axially outermost skirting 14 covers conveniently the joining area between the free end of the skirting 13 and the edge of the carcass turn-up 3.

Also as regards these two layers the inclination of the cords with respect to the circumferential lines is selected as a function of the ratio H/C. More precisely, for H/C=1, the inclination corresponds to 65° at the bead and is variable, along the path of the cords, in a range of about 15° as far as the folding edge; for H/C=0.3, the inclination corresponds to about 40° at the bead and takes a value of about 30° at the edge. As regards intermediate values of the H/C ratio, the angle formed by the cords will vary within the range of the above indicated values.

The portion of said ply inserted between the carcass ply 1 and the two metal layers 9 and 10 of the breaker has a width L''' which corresponds to about 15% of the breaker width L'. Regardless of the breaker width, the portion of the two skirtings 13 and 14 which extends between the carcass and the breaker has a width which may vary from 5 to 25% with respect to the breaker width.

FIG. 2 represents the half section of a tire substantially like that of FIG. 1, so that the same reference numerals have been maintained. The difference between the tire of FIG. 1 and that of FIG. 2 lies in the fact that the latter comprises in each sidewall at least one strip of textile cords, parallel to the circumferential lines and arranged in an axially outermost position with respect to the reinforcing element 12, the strip extending from the zone of the tire shoulder as far as at least one half of the tire section height.

In the alternative embodiment shown in FIG. 2 and FIG. 3, the strip 15 of textile cords, made of a material which decreases in length when subjected to heat, as for instance aliphatic polyamide or nylon, is the prolongation of the textile strip 11 of the breaker, which extends radially in the sidewall as far as to reach a point corresponding to the half section H of the tire. As said above, the cords of said strip 15 are parallel to the circumferential lines of the tire.

In both of the embodiments shown in FIGS. 1 and 2 the bead zone further comprises, conveniently, two strips of metal cords 16 and 17 which have an outer position with respect to the carcass turn-up 3, but are axially innermost with respect to the reinforcing element 12. The axially innermost strip 16 extends from the bead as far as to reach about 30% of H and its cords are arranged at 90° with respect to the circumferential lines. The axially outermost strip 17 has instead its cords arranged at 15° with respect to the circumferential lines of the tire and extends from the bead as far as to reach about 45% of H. The respective portions of strips 16 and 17 can be conveniently inverted if this is considered appropriate to facilitate the tire construction steps.

Pneumatic tires prepared according to the present invention have shown, in tests carried out on road and on track, that the insertion in each sidewall, besides the reinforcing element, of the two layers of cords and, if desired, of the textile strip having cords parallel to the circumferential lines results in very good results, namely running times, in slalom-type tests, which are better than those obtainable with tires having sidewalls reinforced in a conventional manner. Moreover, high speed tests have shown that the life of the tires provided by the present invention has never ended because of detachments of the layers in the breaker or in any other structural element of the tire, but only because of the tread wear.

This very good result can be explained by the fact that the anchorage obtained between the breaker and the core through the two layers of cords provided in each sidewall allows a better distribution of the stresses originated in the contact area along the whole tire circumference.

Consequently, under the severest service conditions, the tire is able to respond to stresses with its whole structure; in particular, in respect to stresses caused by the highest transverse forces. The tire reacts in such a way as to ensure that its maximum tread contact width is constantly gripping the ground.

Further, it is to be noted that the greater stiffness of the sidewalls and the connection of the two reinforcing structures to the tread allows a considerable levelling of the different stiffness existing between the sidewalls and the tread of the tire, thus preventing the occurrence of the dynamic wave and of the harmful detachments it may originate.

Although the present invention has been described in detail for the purpose of illustration it is understood that such detail is solely for that purpose and that variations can be made therein by those skilled in the art without departing from the spirit and scope of the invention except as it may be limited by the claims.

What is claimed is:

1. A pneumatic tire for vehicle wheels which comprises a carcass comprising at least one layer of cords laying in substantially radial planes, a tread, a breaker arranged between said carcass and said tread and comprising at least two layers of cords made of a material having a tensile strength of at least 260 kg/mm$^2$, said cords being parallel to one another in each layer and crossed with respect to those of the adjacent layer and forming an angle ranging between 10° and 35° with respect to the equatorial plane, and at least one strip of textile cords made of a material which shrinks in length when heated, said textile cords being parallel to the equatorial plane and being arranged in a radially outermost position with respect to said layers, said tire comprising, in each sidewall, a reinforcing element comprising at least one layer of reinforcing cords inclined with respect to the circumferential lines of the tire, said reinforcing element extending radially at least from the zone axially adjacent the bead core to a point where its radially outer portion is disposed between said layers and said breaker strip, that portion of said reinforcing element which is disposed between said layers and said strip having a width ranging between 5% and 30% of the breaker width, said reinforcing element being arranged in an axially outermost position with respect to the carcass, said tire being characterized in that it further comprises, in each sidewall at least two layers of cords parallel to each other in each layer and crossed with respect to those of the adjacent layer, said cords forming an angle ranging from 30° to 65° with respect to the circumferential lines, said two layers being arranged between said carcass and said reinforcing element and extending radially from the zone axially adjacent the bead core as far as to extend with their radially outer portion between said carcass and said breaker layers, and in that said reinforcing element has its cords inclined at an angle ranging from 25° to 90°.

2. A pneumatic tire as in claim 1, characterized in that said two layers of cords arranged in each sidewall comprise a single ply folded on itself.

3. A pneumatic tire as in claim 2, characterized in that the folding edge of said ply forming said two layers is arranged between the cord layers of the breaker and the carcass.

4. A pneumatic tire as in claim 1, characterized in that said two layers of cords arranged in each sidewall extend between the carcass and the two breaker layers for a portion having a width ranging between 5% and 25% of the width of said breaker.

5. A pneumatic tire as in claim 1, characterized in that the radially inner ends of said two layers of cords arranged in each sidewall are disposed in the zone adjacent the cores, in an axially outer position with respect to the carcass turn-ups.

6. A pneumatic tire as in claim 1, characterized in that it comprises in each sidewall at least one strip of textile cords parallel to the circumferential lines, arranged in an axially outermost position with respect to said reinforcing element, said strip extending from the shoulder zone as far as at least one half of the tire section height.

7. A pneumatic tire as in claim 6, characterized in that said strip is made of a material which shrinks in length when heated.

8. A pneumatic tire as in claim 6, characterized in that said strip is the prolongation of the strip of textile cords of the breaker.

9. The pneumatic tire of claim 1 wherein said reinforcing element comprises at least one layer of textile cords.

10. The pneumatic tire of claim 1 wherein the said reinforcing element comprises at least one layer of metal cords.

* * * * *